(12) United States Patent
Ward et al.

(10) Patent No.: US 8,065,732 B1
(45) Date of Patent: *Nov. 22, 2011

(54) OBJECT REFERENCE IN A SYSTEM

(75) Inventors: Chad Ward, Cupertino, CA (US); Ankur Lahoti, Lucknow (IN); Kenny Tidwell, Los Altos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/630,573

(22) Filed: Dec. 3, 2009

Related U.S. Application Data

(63) Continuation of application No. 11/029,920, filed on Jan. 4, 2005, now Pat. No. 7,647,632.

(51) Int. Cl.
*G06F 17/30* (2006.01)
*G06F 17/10* (2006.01)

(52) U.S. Cl. ............ 726/22; 707/999.103; 707/999.104; 707/999.105; 707/999.106; 719/315; 719/332

(58) Field of Classification Search .................... 726/22; 707/999.103, 999.104, 999.105, 999.106; 719/315, 332

See application file for complete search history.

(56) References Cited

U.S. PATENT DOCUMENTS

| | | | |
|---|---|---|---|
| 5,557,742 A | 9/1996 | Smaha et al. | |
| 5,717,919 A | 2/1998 | Kodavalla et al. | |
| 5,850,516 A | 12/1998 | Schneier | |
| 5,956,404 A | 9/1999 | Schneier et al. | |
| 5,978,475 A | 11/1999 | Schneier et al. | |
| 6,026,413 A | 2/2000 | Challenger et al. | |
| 6,070,244 A | 5/2000 | Orchier et al. | |
| 6,134,583 A | 10/2000 | Herriot | |
| 6,134,664 A | 10/2000 | Walker | |
| 6,192,034 B1 | 2/2001 | Hsieh et al. | |
| 6,275,942 B1 | 8/2001 | Bernhard et al. | |
| 6,321,338 B1 | 11/2001 | Porras et al. | |
| 6,408,391 B1 | 6/2002 | Huff et al. | |
| 6,408,404 B1 | 6/2002 | Ladwig | |
| 6,453,324 B1 | 9/2002 | Baisley et al. | |
| 6,484,203 B1 | 11/2002 | Porras et al. | |
| 6,542,075 B2 | 4/2003 | Barker et al. | |
| 6,557,012 B1 | 4/2003 | Arun et al. | |
| 6,578,078 B1 * | 6/2003 | Smith et al. | 709/224 |
| 6,694,362 B1 | 2/2004 | Secor et al. | |
| 6,704,874 B1 | 3/2004 | Porras et al. | |
| 6,708,212 B2 | 3/2004 | Porras et al. | |

(Continued)

FOREIGN PATENT DOCUMENTS

WO  WO 02/45315  6/2002

(Continued)

OTHER PUBLICATIONS

U.S. Appl. No. 60/405,921, filed Aug. 26, 2002.

(Continued)

*Primary Examiner* — Minh Dinh
*Assistant Examiner* — Izunna Okeke

(57) ABSTRACT

A system can be configured using configuration objects that have the ability to refer to one another. In one embodiment, the present invention includes such a system having a plurality of objects used to configure the system, each object having a uniform resource identifier (URI), and an object reference table to enable the plurality of objects to reference each other without using URIs.

21 Claims, 5 Drawing Sheets

U.S. PATENT DOCUMENTS

| | | | |
|---|---|---|---|
| 6,711,615 | B2 | 3/2004 | Porras et al. |
| 6,766,350 | B1 | 7/2004 | Moreau |
| 6,839,850 | B1 | 1/2005 | Campbell et al. |
| 6,928,556 | B2 | 8/2005 | Black et al. |
| 6,966,015 | B2 | 11/2005 | Steinberg et al. |
| 6,985,920 | B2 | 1/2006 | Bhattacharya et al. |
| 6,988,208 | B2 | 1/2006 | Hrabik et al. |
| 7,039,953 | B2 | 5/2006 | Black et al. |
| 7,043,727 | B2 | 5/2006 | Bennett et al. |
| 7,089,428 | B2 | 8/2006 | Farley et al. |
| 7,096,418 | B1 | 8/2006 | Singhal et al. |
| 7,127,743 | B1 | 10/2006 | Khanolkar et al. |
| 7,143,444 | B2 | 11/2006 | Porras et al. |
| 7,159,237 | B2 | 1/2007 | Schneier et al. |
| 7,168,093 | B2 | 1/2007 | Hrabik et al. |
| 7,171,689 | B2 | 1/2007 | Beavers |
| 7,219,239 | B1 | 5/2007 | Njemanze et al. |
| 7,260,844 | B1 | 8/2007 | Tidwell et al. |
| 7,278,160 | B2 | 10/2007 | Black et al. |
| 7,308,689 | B2 | 12/2007 | Black et al. |
| 7,318,178 | B2 | 1/2008 | Steinberg et al. |
| 7,333,999 | B1 | 2/2008 | Njemanze |
| 7,340,776 | B2 | 3/2008 | Zobel et al. |
| 7,370,359 | B2 | 5/2008 | Hrabik et al. |
| 7,376,969 | B1 | 5/2008 | Njemanze et al. |
| 7,379,993 | B2 | 5/2008 | Valdes et al. |
| 7,418,733 | B2 | 8/2008 | Connary et al. |
| 7,437,359 | B2 | 10/2008 | Aguilar-Macias et al. |
| 7,483,972 | B2 | 1/2009 | Bhattacharya et al. |
| 7,506,373 | B2 | 3/2009 | Morin et al. |
| 7,509,677 | B2 | 3/2009 | Saurabh et al. |
| 7,562,388 | B2 | 7/2009 | Hackenberger et al. |
| 7,577,633 | B2 | 8/2009 | Shankar et al. |
| 7,594,260 | B2 | 9/2009 | Porras et al. |
| 7,644,365 | B2 | 1/2010 | Bhattacharya et al. |
| 7,647,632 | B1 | 1/2010 | Ward et al. |
| 2002/0019945 | A1 | 2/2002 | Houston et al. |
| 2002/0147803 | A1 | 10/2002 | Dodd et al. |
| 2003/0084349 | A1 | 5/2003 | Friedrichs et al. |
| 2003/0093692 | A1 | 5/2003 | Porras |
| 2003/0188189 | A1 | 10/2003 | Desai et al. |
| 2003/0221123 | A1 | 11/2003 | Beavers |
| 2004/0024864 | A1 | 2/2004 | Porras et al. |
| 2004/0203764 | A1 | 10/2004 | Hrastar et al. |
| 2004/0221191 | A1 | 11/2004 | Porras et al. |
| 2005/0027845 | A1 | 2/2005 | Secor et al. |
| 2006/0020657 | A1 | 1/2006 | Liu et al. |
| 2006/0095587 | A1 | 5/2006 | Bhattacharya et al. |
| 2006/0149712 | A1 | 7/2006 | Kindsvogel et al. |
| 2006/0212932 | A1 | 9/2006 | Patrick et al. |
| 2007/0136437 | A1 | 6/2007 | Shankar et al. |
| 2007/0150579 | A1 | 6/2007 | Morin et al. |
| 2007/0162973 | A1 | 7/2007 | Schneier et al. |
| 2007/0234426 | A1 | 10/2007 | Khanolkar et al. |
| 2008/0104046 | A1 | 5/2008 | Singla et al. |
| 2008/0104276 | A1 | 5/2008 | Lahoti et al. |
| 2008/0162592 | A1 | 7/2008 | Huang et al. |
| 2008/0165000 | A1 | 7/2008 | Morin et al. |
| 2010/0058165 | A1 | 3/2010 | Bhattacharya et al. |

FOREIGN PATENT DOCUMENTS

| | | |
|---|---|---|
| WO | WO 02/060117 | 8/2002 |
| WO | WO 02/078262 | 10/2002 |
| WO | WO 02/101988 | 12/2002 |
| WO | WO 03/009531 | 1/2003 |
| WO | WO 2004/019186 | 3/2004 |
| WO | WO 2005/001655 | 1/2005 |
| WO | WO 2005/026900 | 3/2005 |

OTHER PUBLICATIONS

U.S. Appl. No. 10/308,767, filed Dec. 2, 2002.
U.S. Appl. No. 10/308,548, filed Dec. 2, 2002.
U.S. Appl. No. 10/308,941, filed Dec. 2, 2002.
U.S. Appl. No. 10/308,416, filed Dec. 2, 2002.
U.S. Appl. No. 10/308,418, filed Dec. 2, 2002.
U.S. Appl. No. 10/308,417, filed Dec. 2, 2002.
U.S. Appl. No. 10/308,584, filed Dec. 2, 2002.
U.S. Appl. No. 10/733,073, filed Dec. 10, 2003.
U.S. Appl. No. 10/713,471, filed Nov. 14, 2003.
U.S. Appl. No. 10/683,221, filed Oct. 10, 2003.
U.S. Appl. No. 10/683,191, filed Oct. 10, 2003.
U.S. Appl. No. 10/821,459, filed Apr. 9, 2004.
U.S. Appl. No. 10/839,563, filed May 4, 2004.
U.S. Appl. No. 10/976,075, filed Oct. 27, 2004.
U.S. Appl. No. 10/975,962, filed Oct. 27, 2004.
U.S. Appl. No. 10/974,105, filed Oct. 27, 2004.
U.S. Appl. No. 11/021,601, filed Dec. 23, 2004.
U.S. Appl. No. 11/070,024, filed Mar. 1, 2005.
U.S. Appl. No. 11/740,203, filed Apr. 25, 2007.
U.S. Appl. No. 11/836,251, filed Aug. 9, 2007.
U.S. Appl. No. 12/098,322, filed Apr. 4, 2008.
U.S. Appl. No. 11/023,942, filed Dec. 24, 2004.
ARCSIGHT, "About ArcSight Team," date unknown, [online] [Retrieved on Oct. 25, 2002] Retrieved from the Internet <URL: http://www.arcsight.com/about_team.htm>.
ARCSIGHT, "About Overview," Oct. 14, 2002, [online] [Retrieved on Apr. 21, 2006] Retrieved from the Internet <URL: http://web.archive.org/web/20021014041614/http://www.arcsight.com/about.htm>.
ARCSIGHT, "Contact Info," date unknown, [online] [Retrieved on Oct. 25, 2002] Retrieved from the Internet <URL: http://www.arcsight.com/contact.htm>.
ARCSIGHT, "Enterprise Coverage: Technology Architecture," date unknown, [online] Retrieved from the Internet <URL: http://www.snaiso.com/Documentation/Arcsight/arcsight_archdta.pdf>.
ARCSIGHT, "Managed Process: ArcSight Reporting System," date unknown, [online] Retrieved from the Internet <URL: http://www.snaiso.com/Documentation/Arcsight/arcsight_reportsys.pdf>.
ARCSIGHT, "Managed Process: Console-Based Management," date unknown, [online] Retrieved from the Internet <URL: http://www.snaiso.com/Documentation/Arcsight/arcsight_console.pdf >.
ARCSIGHT, "Precision Intelligence: SmartRulesTM and Cross-Correlation," date unknown, [online] Retrieved from the Internet <URL: http://www.snaiso.com/Documentation/Arcsight/arcsight_correlation.pdf>.
ARCSIGHT, "Precision Intelligence: SmartAgentTM," date unknown, [online] Retrieved from the Internet <URL: http://www.ossmanagement.com/SmartAgent.pdf>.
ARCSIGHT, "Product Info: Product Overview and Architecture," date unknown, [online] [Retrieved on Oct. 25, 2002] Retrieved from the Internet <URL: http://www.arcsight.com/product.htm>.
ARCSIGHT, "Product Info: 360° Intelligence Yields Precision Risk Management," date unknown, [online] [Retrieved on Oct. 25, 2002] Retrieved from the Internet <URL: http://www.arcsight.com/product_infoO1.htm>.
ARCSIGHT, "Product Info: ArcSight SmartAgents," Oct. 10, 2002, [online] [Retrieved on Apr. 21, 2006] Retrieved from the Internet <URL:http://web.archive.org/web/20021010135236/http://www.arcsight.com/product_info02.htm>.
ARCSIGHT, "Product Info: ArcSight Cross-Device Correlation," date unknown, [online] [Retrieved on Oct. 25, 2005] Retrieved from the Internet <URL: http://www.arcsight.com/product_info03.htm>.
ARCSIGHT, "Product Info: ArcSight Manager," date unknown, [online] [Retrieved on Oct. 25, 2002] Retrieved from the Internet <URL: http://www.arcsight.com/product_info04.htm>.
ARCSIGHT, "Product Info: ArcSight Console," date unknown, [online] [Retrieved on Nov. 15, 2002] Retrieved from the Internet <URL: http:www.arcsight.com/product_info05.htm>.
ARCSIGHT, "Product Info: ArcSight Reporting System," date unknown, [online] [Retrieved on Oct. 25, 2002] Retrieved from the Internet <URL: http:www.arcsight.com/product_info06.htm>.
ARCSIGHT, "Product Info: Enterprise Scaling," date unknown, [online] [Retrieved on Oct. 25, 2002] Retrieved from the Internet <URL: http://www.arcsight.com/product_info07.htm>.
ARCSIGHT, "Security Management for the Enterprise," 2002, [online] [Retrieved on Oct. 25, 2002] Retrieved from the Internet <URL: http:www.arcsight.com/>.
ARCSIGHT, "Technical Brief: How Correlation Eliminates False Positives," date unknown, source unknown.

Bruneau, G., "What Difficulties are Associated on Matching Events with Attacks. Why is Event/Data Correlation Important?," 2001, [online] [Retrieved on Nov. 1, 2002] Retrieved from the Internet <URL: http://www.sans.org/newlook/resources/IDFAQ/matching.htm>.

Burleson, D., "Taking Advantage of Object Partitioning in Oracle8i," Nov. 8, 2000, [online] [Retrieved on Apr. 20, 2004] Retrieved from the Internet <URL: http://www.dba-oracle.com/art_partit.htm>.

CERT Coordination Center, "Overview of Attack Trends," 2002, [online] Retrieved from the Internet <URL: http://www.cert.org/archive/pdf/attack_trends.pdf>.

Cheung, S. et al., "Emerald Intrusion Incident Report: 601 Message Specification," Aug. 10, 2000, System Design Laboratory, SRI International.

Derodeff, C. "Got Correlation? Not Without Normalization," 2002, [online] Retrieved from the Internet <URL: http://www.svic.com/papers/pdf/Got-Correlation_rmalization.pdf>.

Haley Enterprise, "Production Systems," 2002, [online] [Retrieved on Oct. 29, 2002] Retrieved from the Internet <URL: http://www.haley.com/0072567836705810/ProductionSystems.html>.

Haley Enterprise, "The Rete Algorithm," 2002, [online] [Retrieved on Oct. 29, 2002] Retrieved from the Internet <URL: http://www.haley.com/0072567836705810/ReteAlgorithm.html>.

Haley Enterprise, "A Rules Engine for Java Based on the Rete Algorithm," 2002, [online] [Retrieved on Oct. 29, 2002] Retrieved from the Internet <URL: http://www.haley.com/0072567836705810/ReteAlgorithmForRules.html>.

Halme, L.R. et al., "Aint Misbehaving: A Taxonomy of Anti-Intrusion Techniques," 2000, [online] [Retrieved on Nov. 1, 2002] Retrieved from the Internet <URL: http://www.sans.org/newlook/resources/IDFAQ/aint.htm>.

Heberlein, L. T., et al., "A Method to Detect Intrusive Activity in a Networked Environment," Proceedings of the Fourteenth National Computer Security Conference, NIST/NCSC, Oct. 1-4, 1991, Washington, D.C., pp. 362-371.

Ingargiola, G., "The Rete Algorithm," date unknown, [online] [Retrieved on Oct. 29, 2002] Retrieved from the Internet <URL: http://yoda.cis.temple.edu:8080/UGAIWWW/lectures/rete.html>.

Javitz, H. S., et al., "The NIDES Statistical Component Description and Justification," SRI Project 3131, Contract N00039-92-C-0015, Annual Report, A010, Mar. 7, 1994.

Jou, Y. F., et al., "Architecture Design of a Scalable Intrusion Detection System for the Emerging Network Infrastructure," MCNC, Technical Report CDRL A005, Apr. 1997.

Lindqvist, U. et al., "Detecting Computer and Network Misuse Through the Production-Based Expert System Toolset (P-BEST)," Proceedings of the IEEE Symposium on Security and Privacy, Oakland, California, May 9-12, 1999.

National Institute of Standards and Technology (NIST), "Federal Information Processing Standards Publication (FIPS PUB) 199: Standards for Security Categorization of Federal Information and Information Systems", Feb. 2004.

National Institutes of Health (NIH), "Table 1: Security Categorization of Federal Information and Information Systems," revised Jul. 8, 2005, [online] [retrieved on Apr. 6, 2006] Retrieved from the Internet <URL: http://irm.cit.nih.gov/security/table1.htm>.

Porras, P.A. et al., "Emerald: Event Monitoring Enabling Responses to Anomalous Live Disturbances," Oct. 1997, Proceedings of the 20th NIST-NCSC National Information Systems Security (NISS) Conference.

Porras, P.A. et al., "A Mission-Impact-Based Approach to INFOSEC Alarm Correlation," Oct. 2002, Lecture Notes in Computer Science, Proceedings: Recent Advances in Intrusion Detection, pp. 95-114, Zurich, Switzerland.

Porras, P. A., et al., "Live Traffic Analysis of TCP/IP Gateways," Symposium on Networks and Distributed Systems Security, Internet Society, Mar. 1998.

Robinson, S. L., "Memorandum Opinion" in *SRI International, Inc. v. Internet Security Systems, Inc. and Symantec Corporation* (D. Del., Civ. No. 04-1199-SLR), Oct. 17, 2006.

Valdes, A., et al., "Statistical Methods for Computer Usage Anomaly Detection Using NIDES (Next-Generation Intrusion Detection Expert System)," Proceedings of the Third International Workship on Rough Sets and Soft Computing (RSSC 94), Jan. 27, 1995, San Jose, CA, pp. 306-311.

Wood, M., et al., "Internet-Draft: Intrusion Detection Message Exchange Requirements," Jun. 23, 2002, [online] [Retrieved on Nov. 1, 2002] Retrieved from the Internet <URL: http://www.silicondefense.com/idwg/draft-ietf-idwg-requirements-07.txt>.

\* cited by examiner

Object Reference Table 30

| Reference Identifier 34 | URI 36 | Object Identifier 38 | External Identifier 40 |
|---|---|---|---|
| | | | |
| | | | |
| | | | |
| | | | |
| | | | |

Entry 32

Figure 2

OBJECT REFERENCE IN A SYSTEM

CROSS-REFERENCE TO RELATED APPLICATION

This application is a continuation of U.S. application Ser. No. 11/029,920, filed on Jan. 4, 2005, entitled "Object Reference in a System" which is incorporated herein by reference in its entirety.

FIELD OF THE INVENTION

The present invention relates to a computer-based system having objects used to configure the system, and specifically to referencing the objects used to configure the system.

BACKGROUND

Computer networks and systems have become indispensable tools for modern business. Today terabits of information on virtually every subject imaginable are stored in and accessed across such networks by users throughout the world. Much of this information is, to some degree, confidential and its protection is required. Not surprisingly then, intrusion detection systems (IDS) have been developed to help uncover attempts by unauthorized persons and/or devices to gain access to computer networks and the information stored therein. In addition, network devices such as routers and firewalls maintain activity logs that can be used to examine such attempts.

Intrusion detection may be regarded as the art of detecting inappropriate, incorrect or anomalous activity within or concerning a computer network or system. The most common approaches to intrusion detection are statistical anomaly detection and pattern-matching detection. IDS that operate on a host to detect malicious activity on that host are called host-based IDS (HIDS), which may exist in the form of host wrappers/personal firewalls or agent-based software, and those that operate on network data flows are called network-based IDS (NIDS). Host-based intrusion detection involves loading software on the system (the host) to be monitored and using log files and/or the host's auditing agents as sources of data. In contrast, a network-based intrusion detection system monitors the traffic on its network segment and uses that traffic as a data source. Packets captured by the network interface cards are considered to be of interest if they match a signature.

Regardless of the data source, there are two complementary approaches to detecting intrusions: knowledge-based approaches and behavior-based approaches. Almost all IDS tools in use today are knowledge-based. Knowledge-based intrusion detection techniques involve comparing the captured data to information regarding known techniques to exploit vulnerabilities. When a match is detected, an alarm is triggered. Behavior-based intrusion detection techniques, on the other hand, attempt to spot intrusions by observing deviations from normal or expected behaviors of the system or the users (models of which are extracted from reference information collected by various means). When a suspected deviation is observed, an alarm is generated.

Advantages of the knowledge-based approaches are that they have the potential for very low false alarm rates, and the contextual analysis proposed by the intrusion detection system is detailed, making it easier for a security officer using such an intrusion detection system to take preventive or corrective action. Drawbacks include the difficulty in gathering the required information on the known attacks and keeping it up to date with new vulnerabilities and environments.

Advantages of behavior-based approaches are that they can detect attempts to exploit new and unforeseen vulnerabilities. They are also less dependent on system specifics. However, the high false alarm rate is generally cited as a significant drawback of these techniques and because behaviors can change over time, the incidence of such false alarms can increase.

Regardless of whether a host-based or a network-based implementation is adopted and whether that implementation is knowledge-based or behavior-based, an intrusion detection system is only as useful as its ability to discriminate between normal system usage and true intrusions (accompanied by appropriate alerts). If intrusions can be detected and the appropriate personnel notified in a prompt fashion, measures can be taken to avoid compromises to the protected system. Otherwise such safeguarding cannot be provided. Accordingly, what is needed is a system that can provide accurate and timely intrusion detection and alert generation so as to effectively combat attempts to compromise a computer network or system.

SUMMARY OF THE INVENTION

A system can be configured using configuration objects that have the ability to refer to one another. In one embodiment, the present invention includes such a system having a plurality of objects used to configure the system, each object having a uniform resource identifier (URI), and an object reference table to enable the plurality of objects to reference each other without using URIs.

BRIEF DESCRIPTION OF THE DRAWINGS

The present invention is illustrated by way of example, and not limitation, in the figures of the accompanying drawings in which:

FIG. 2 is a block diagram of an object reference table according to one embodiment of the present invention;

DETAILED DESCRIPTION

Figure 1:
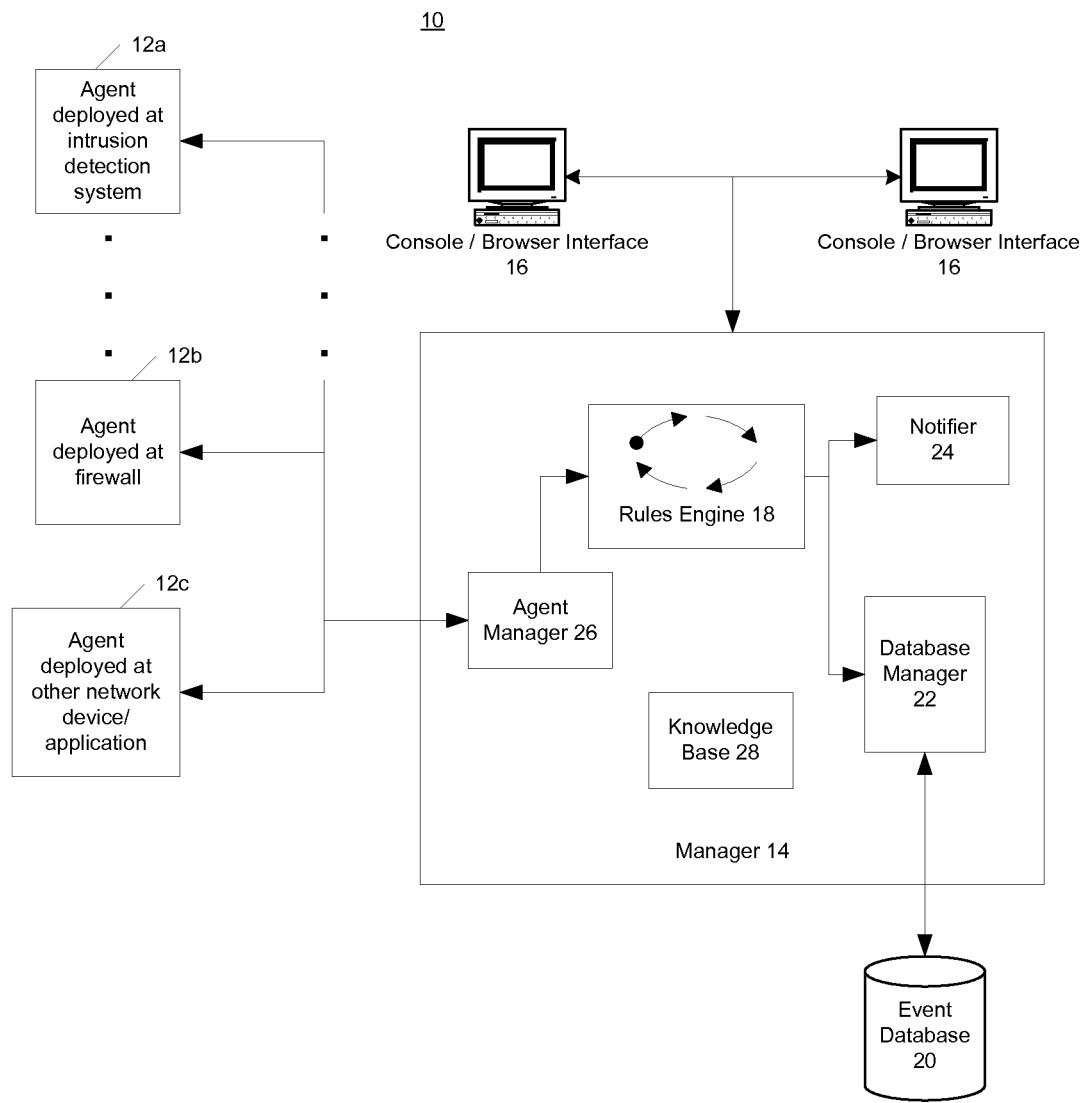
FIG. 1 is a block diagram of a network security system according to one embodiment of the present invention.

Although the present system will be discussed with reference to various illustrated examples, these examples should not be read to limit the broader spirit and scope of the present invention. For example, the examples presented herein describe distributed agents, managers and consoles, which are but one embodiment of the present invention. The general concepts and reach of the present invention are much broader and may extend to any computer-based or network-based security system. Also, examples of the messages that may be passed to and from the components of the system and the data schemas that may be used by components of the system are given in an attempt to further describe the present invention, but are not meant to be all-inclusive examples and should not be regarded as such.

Some portions of the detailed description that follows are presented in terms of algorithms and symbolic representations of operations on data within a computer memory. These algorithmic descriptions and representations are the means used by those skilled in the computer science arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. It should be borne in mind, however, that all of these and similar terms are to be associated with the appropriate physical quantities and are merely convenient labels applied to these quantities. Unless specifically stated otherwise, it will be appreciated that throughout the description of the present invention, use of terms such as "processing", "computing", "calculating", "determining", "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

As indicated above, one embodiment of the present invention is instantiated in computer software, that is, computer readable instructions, which, when executed by one or more computer processors/systems, instruct the processors/systems to perform the designated actions. Such computer software may be resident in one or more computer readable media, such as hard drives, CD-ROMs, DVD-ROMs, read-only memory, read-write memory and so on. Such software may be distributed on one or more of these media, or may be made available for download across one or more computer networks (e.g., the Internet). Regardless of the format, the computer programming, rendering and processing techniques discussed herein are simply examples of the types of programming, rendering and processing techniques that may be used to implement aspects of the present invention. These examples should in no way limit the present invention, which is best understood with reference to the claims that follow this description.

Referring now to FIG. 1, an example of a computer-based network security system 10 architected in accordance with an embodiment of the present invention is illustrated. System 10 includes agents 12, one or more managers 14 and one or more consoles 16 (which may include browser-based versions thereof). In some embodiments, agents, managers and/or consoles may be combined in a single platform or distributed in two, three or more platforms (such as in the illustrated example). The use of this multi-tier architecture supports scalability as a computer network or system grows.

Agents 12 are software programs that provide efficient, real-time (or near real-time) local event data capture and filtering from a variety of network security devices and/or applications. The primary sources of security events are common network security devices, such as firewalls, intrusion detection systems and operating system logs. Agents 12 can collect events from any source that produces event logs or messages and can operate at the native device, at consolidation points within the network, and/or through simple network management protocol (SNMP) traps.

Agents 12 are configurable through both manual and automated processes and via associated configuration files. Each agent 12 may include one or more software modules including a normalizing component, a time correction component, an aggregation component, a batching component, a resolver component, a transport component, and/or additional components. These components may be activated and/or deactivated through appropriate commands in the configuration file.

Managers 14 may be server-based components that further consolidate, filter and cross-correlate events received from the agents, employing a rules engine 18 and a centralized event database 20. One role of manager 14 is to capture and store all of the real-time and historic event data to construct (via database manager 22) a complete, enterprise-wide picture of security activity. The manager 14 also provides centralized administration, notification (through one or more notifiers 24), and reporting, as well as a knowledge base 28 and case management workflow. The manager 14 may be deployed on any computer hardware platform and one embodiment utilizes a relational database management system such as an Oracle™ database to implement the event data store component, such as event database 20. Communications between manager 14 and agents 12 may be bi-directional (e.g., to allow manager 14 to transmit commands to the platforms hosting agents 12) and encrypted. In some installations, managers 14 may act as concentrators for multiple agents 12 and can forward information to other managers (e.g., deployed at a corporate headquarters).

Consoles 16 are computer- (e.g., workstation-) based applications that allow security professionals to perform day-to-day administrative and operation tasks such as event monitoring, rules authoring, incident investigation and reporting. Access control lists allow multiple security professionals to use the same system and event database, with each having their own views, correlation rules, alerts, reports and knowledge base appropriate to their responsibilities. A single manager 14 can support multiple consoles 16.

In some embodiments, a browser-based version of the console 16 may be used to provide access to security events, knowledge base articles, reports, notifications and cases. That is, the manager 14 may include a web server component accessible via a web browser hosted on a personal or handheld computer (which takes the place of console 16) to provide some or all of the functionality of a console 16. Browser access is particularly useful for security professionals that are away from the consoles 16 and for part-time users. Communication between consoles 16 and manager 12 is bi-directional and may be encrypted.

Through the above-described architecture the present invention can support a centralized or decentralized environment. This is useful because an organization may want to implement a single instance of system 10 and use an access control list to partition users. Alternatively, the organization may choose to deploy separate systems 10 for each of a number of groups and consolidate the results at a "master" level. Such a deployment can also achieve a "follow-the-sun" arrangement where geographically dispersed peer groups collaborate with each other by passing primary oversight responsibility to the group currently working standard business hours. Systems 10 can also be deployed in a corporate hierarchy where business divisions work separately and support a rollup to a centralized management function.

The exemplary network security system illustrated in FIG. 1 is described in further detail in U.S. application Ser. No.

10/308,415, entitled "Real Time Monitoring and Analysis of Events from Multiple Security Devices", filed Dec. 2, 2002, which is hereby incorporated fully by reference.

As set forth above, the network security system 10, and the manager 14 in particular, operates according to various rules, and other configuration objects. In one embodiment, these objects are part of the knowledge base 28. Such objects include correlation rules used by the rules engine 18, filters used to apply the rules, address lists for notification groups used by the notifier 24, users and their permissions, search facilities and data structures, report descriptions, reports, search result view configurations including event fields to display, and various models of the networks being monitored among others. Collectively, these data structures, code modules, memory blocks, and configured values are referred to in this application as objects or configuration objects.

Generally, objects in systems are identified by a uniform resource identifier, abbreviated as URI. As a common example, a URL (uniform resource locator) used to identify websites includes a URI that identifies a specific page in a web site. A URI identifies the object by its directory path from the root directory to the name of the individual object. For example a rule for high priority intrusion detection system-type events may have the URI "/All Rules/System Rules/IDS Rules/High Priority IDS events." Thus, the High Priority IDS events rule is in the IDS rules directory, which in turn is in the System Rules directory, which in turn is in the All Rules directory.

In previous systems, these objects are referred to using the URIs. For example, if the High Priority IDS events rule needs to access an IDS filter (a filter that only passes IDS events), it would refer to the URI of the IDS filter, which is another object. Using URIs in this manner can have various disadvantages, one of which being that URIs change when objects are moved from one directory to another. This problem is similar to the referential integrity problem familiar in databases using primary keys and foreign keys.

To overcome this and other problems caused by object reference, in one embodiment, the system uses a side table to refer to objects, herein referred to as the object reference table. One embodiment of the object reference table 30 is now described with reference to FIG. 2. The object reference table 30 can be implemented as a simple table, such as those used by databases. Each entry (also known as a record) in the table describes the references for one object corresponding with the entry.

One example entry 32 is highlighted for detailed description. In one embodiment, entry 32 includes a reference identifier 34, a URI 36, an object identifier 38, and an external identifier 40. Other embodiments can omit the external identifier 40 or other fields depending on the implementation of the table 30.

In one embodiment, the reference identifier 34 is the identifier used by other objects to refer to the object. The reference identifier 34 can be the number of the entry in the table, or any other identifier uniquely identifying one entry in the table. Thus, for example, an object can be referred to as RID(345), referring to the object associated with the 345$^{th}$ entry in the object reference table 30. The URI 36 is the URI of the object associated with the entry 32, as defined by the name and directory path of the object, as explained above.

In one embodiment, the object identifier 38 is a system-wide unique identifier associated with the object by the entry 32. In another embodiment, the object identifier 38 is a globally unique identifier. In one embodiment, the external identifier 40 is a common name associated with the object by outside suppliers of the object, such as other system vendors.

In some embodiments of the present invention, the object identifier 38 and the external identifier 40 can function as foreign keys that point to other tables identifying the locations of the objects, as will be apparent from the description below. Various uses of the object identifier 38 and the external identifier 40 are now described with reference to FIGS. 3-5.

Figure 3:
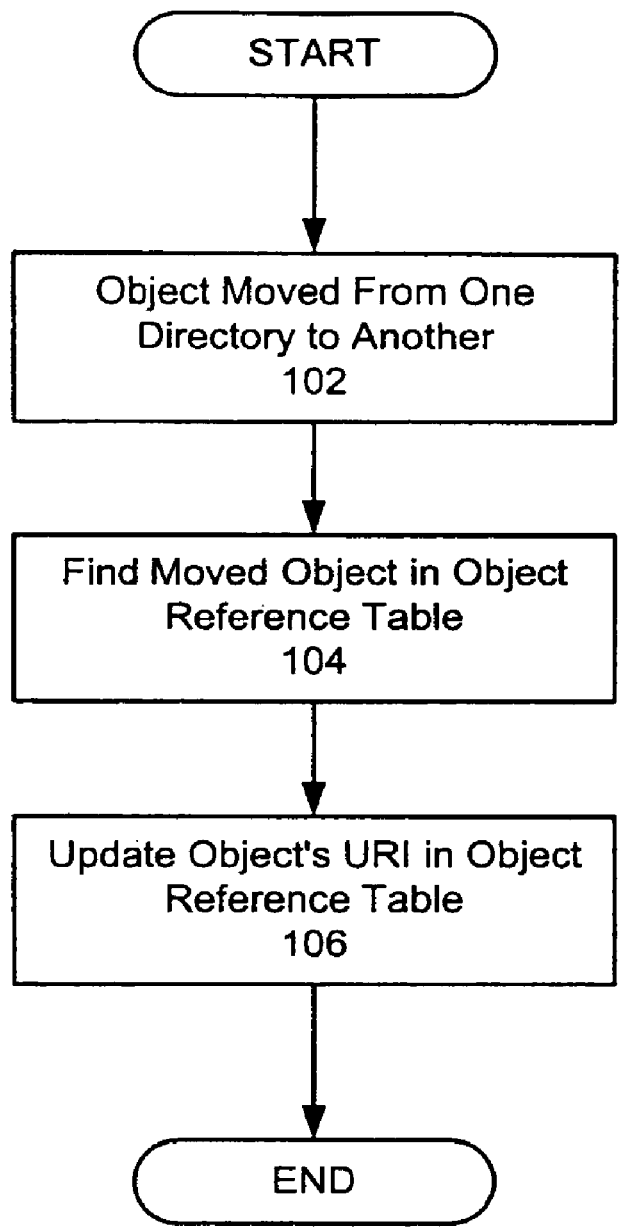
FIG. 3 is a flow diagram of object reference processing according to one embodiment of the present invention.

FIG. 3 is a flow diagram illustrating a URI update procedure according to one embodiment of the present invention. The example used to illustrate the blocks of FIG. 3 is the High Priority IDS events rule that refers to the IDS filter set forth in the discussion above. In block 102, an object is moved from one directory to another. For example, the IDS filter is moved from the AllFilters directory to the MyFilters directory. When this happens, the URI of the moved object changes, since the directory path of the new object changed.

In block 104, the entry 32 associated with the moved object is located in the object reference table 30 using its object identifier 38. Since the object identifier 38 is unique either system-wide or globally, a search of the table will locate the one entry 32 corresponding with the moved object. For example, the entry corresponding to the IDS filter is located in the object reference table 30.

In block 106, the URI 36 in the located entry 32 is updated to reflect the new directory path of the moved object, and the processing terminates. Thus, the High Priority IDS Events rule does not need to be updated or aware that the URI of the filter is changed, since the rule does not refer to the filter using its URI. The reference identifier 34 used by the rule to refer to the filter will provide the updated URI 36 for the filter upon subsequent access.

Figure 4:
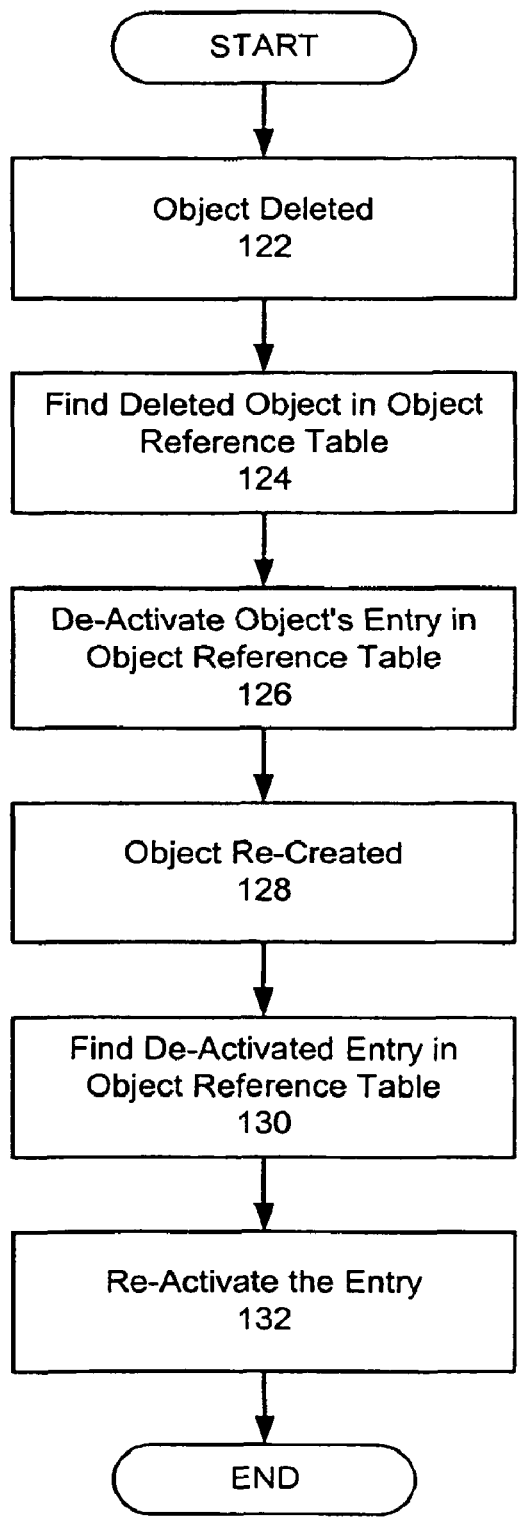
FIG. 4 is a flow diagram of object reference processing according to another embodiment of the present invention.

FIG. 4 is a flow diagram illustrating another aspect of the object reference table according to one embodiment of the present invention. The example used to illustrate the blocks of FIG. 4 remains the High Priority IDS events rule that refers to the IDS filter set forth in the discussion above. In block 122, an object is deleted. Such deletion can occur either purposefully or accidentally. For example, the IDS filter is deleted from the system.

In block 124, the deleted object is located in the object reference table 30. In one embodiment, searching for the object identifier 38 of the object can be performed to locate the deleted object. In another embodiment, the URI of the deleted object can be used to locate it in the table 30.

In block 126, the entry 32 corresponding to the deleted object is deactivated. In one embodiment, this is done by clearing or deleting the object identifier 38 contained in the entry 32 corresponding with the deleted object. For example, the entry associated with the deleted filter would have the object identifier set to NULL. In one embodiment, all other values (object identifier 38, URI 36, and external identifier 40) in the entry 32 remain intact, and the entry 32 itself would not be deleted, but remain in the object reference table 30.

At some later time, in block 128, the object is re-created 128. Whether an object is re-created can be defined in a number of ways. In one embodiment, an object is considered re-created if a new object has the same URI as a formerly deleted object. For example, if the URI of the IDS filter was SystemFilters/AllFilters/IDS Filter before it was deleted, and a new object is created with the same URI (directory path), the filter is presumed to be re-created.

Since the new object is assigned a new object identifier, in block 130, the entry 32 associated with the deleted object is located, e.g., using the URI 36. Then in block 132, the entry 32 is re-activated, e.g., by updating the entry with the new object identifier assigned to the new re-created object. Thus, the rule referring to the filter can use it again without need for further reconfiguration.

In another embodiment, an object is considered re-created if a new object has the same external identifier 40 as the deleted object, and the entry 32 corresponding with the deleted and re-created object is then located using the external identifier. This can be useful when objects are imported into the system. In yet another embodiment, an object is considered re-created if a new object has either the same URI 36 or the same external identifier 40 as the deleted object.

Figure 5:
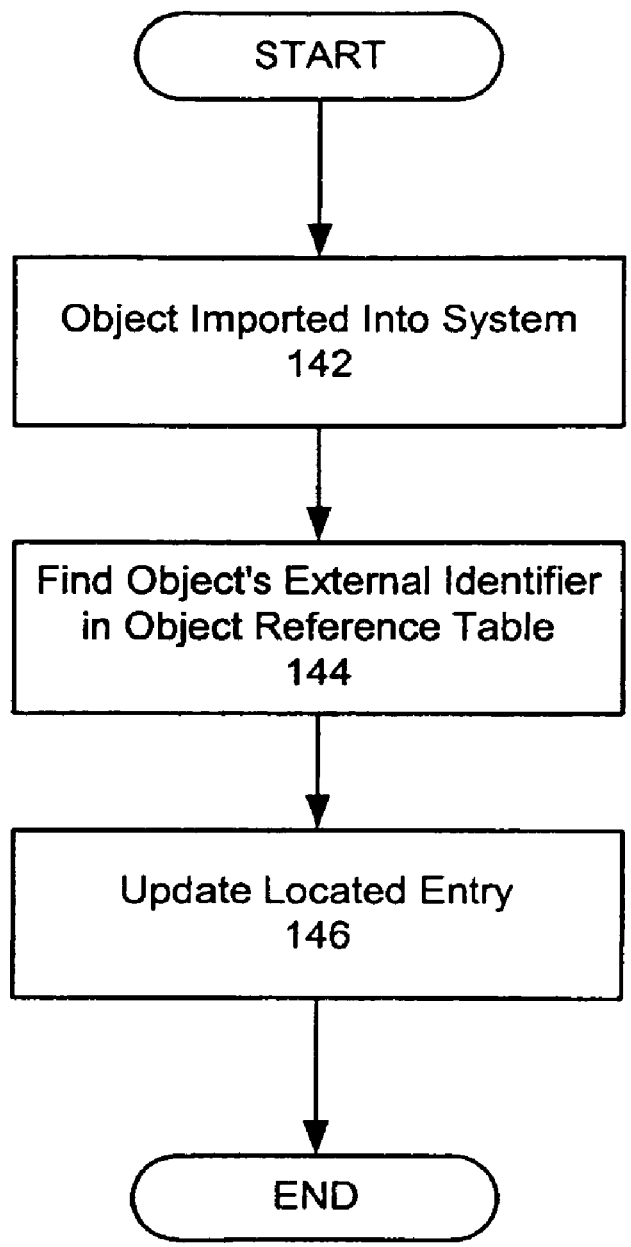
FIG. 5 is a flow diagram of object reference processing according to another embodiment of the present invention.

FIG. 5 is another flow diagram illustrating yet another aspect of the object reference table according to one embodiment of the present invention. In block 142, an object is imported into the system. This can occur during a system reconfiguration, a vendor object release or update, an object import from another system, or any other time pre-created objects are transferred into the system. Many pre-created objects have well-known names. For example, "/All Users/Administrators" is a common name of a file listing the authorized administrator of the system, and "/All Rules/Real-time Rules," is a logical name for the rules currently used by the system, especially if the importation of the foreign objects is from a system produced by the same entity as the system into which the objects are being imported.

In block 144, when the importation is detected, the commonly accepted name of the object is searched for and located in the external identifier column of the object reference table 30. The entry containing the external identifier of the imported object may be an active or a de-activated entry. In one embodiment, if the entry is an active entry, then it is presumed that the imported object is meant to replace the object currently associated with the located entry. In one embodiment, the user is prompted to confirm this before the replacement is performed. In another embodiment, only if the entry is a de-activated entry is the object associated with the located entry, which is then re-activated.

In block 146, the located entry is updated 146 to reflect the association of the imported object with the located entry. In one embodiment, updating the located entry includes updating the URI field in the entry with the URI (name and directory path) of the imported object. Furthermore, the object identifier assigned to the imported object may be also reflected in the updated entry.

In one embodiment, if in block 144 an entry including the external identifier of the imported object is not found, then the object is imported as a new object, not as a replaced or re-activated object. As a new object, a new table entry associated with the object is inserted into the object reference table 30. In one embodiment, this also happens any time a new object enters the system, whether from new object creation by a user or importation from a vendor or another system.

In another embodiment, if in block 144 an entry including the external identifier of the imported object is not found, then the processing picks up at block 128 of FIG. 4, and the imported object is treated as a re-created object. As a recreated object, the URI of the imported object is searched for. If the object is also not found by URI, then it is assumed to be a new object, and processed accordingly.

In one embodiment, the object reference table 30 expands without bound. That is, in one embodiment, entries are never deleted from the table 30. In other embodiments the size of the table 30 is limited, and when the size limit is reached, some entries become deleted according to some scheme, such as cyclically starting with the oldest entries, or systematically starting with the inactivated entries.

In one embodiment, a new object identifier is assigned to every new object, whether the object was newly created or imported into the system. Thus, when a new object is determined to be the re-activation of a formerly deleted object (as in the discussion related to FIG. 4), the old entry is updated to reflect the newly assigned reference number. In one embodiment, the object identifier is globally unique, in part to simplify transferring objects between systems. In another embodiment, the object identifier is only unique system-wide.

In one embodiment of the present invention, there may be multiple entries in the object reference table referencing the same object. For example, if an object with a specific URI is deleted, and another object is moved to the same directory and given the name of the deleted object, both the deleted object's entry and the moved object's entry will reference the moved object, by operation of the processes described above. This can ensure that references using either reference identifier find the object.

In the description above, the object reference table 30 and various methods and processes for using the object reference table 30 were described in context of a network security system 10. However, the embodiments of the present invention described above are equally applicable to any computer system in which configuration objects refer to one another. Examples of systems using such configuration objects include, but are not limited to, document creation systems, file systems, and various bridges, such as switches and routers, in addition to various other network monitor systems.

Thus, a network security system has been described. In the forgoing description, various specific values and data structures were given names, such as "object" and "object reference table," and various specific modules, such as "agents" and "manager" have been described. However, these names are merely to describe and illustrate various aspects of the present invention, and in no way limit the scope of the present invention. Furthermore, various modules, such as the manager 14, and the agents 12 in FIG. 1, can be implemented as software or hardware modules, or without dividing their functionalities into modules at all. The present invention is not limited to any modular architecture either in software or in hardware, whether described above or not.

What is claimed is:

1. A method for updating an object reference table comprising a plurality of records, wherein each record represents an object and comprises an object identifier (OID) field and a uniform resource identifier (URI) field, and wherein an object is electronic data that encodes configuration information for a processor-based system, the method comprising:

using a processor to determine that an object has been deleted, wherein the object is associated with an OID and a URI; and responsive to determining that the object has been deleted:

determining a record in the object reference table that corresponds to the deleted object, wherein a reference identifier associated with the record matches a reference identifier associated with the deleted object; and deleting the OID field value of the record or setting the OID field value of the record to null.

2. The method of claim 1, wherein the reference identifier associated with the deleted object is globally unique.

3. The method of claim 1, wherein the reference identifier associated with the deleted object is used by another object to refer to the object with which the reference identifier is associated.

4. The method of claim 1, further comprising:

determining that an object has been created, wherein the object is associated with an OID and a URI; and responsive to determining that the object has been created:

determining a record in the object reference table that corresponds to the created object, wherein the URI associated with the record matches the URI associated with the created object; and
setting the OID field value of the record to the OID associated with the created object.

5. The method of claim 4, wherein the object that has been created is an imported object.

6. The method of claim 4, wherein the object that has been created is are-activated object.

7. The method of claim 1, further comprising:
determining that an object's URI has changed, wherein the object is associated with an OID and a URI; and
responsive to determining that the object's URI has changed:
determining a record in the object reference table that corresponds to the changed object, wherein the OID associated with the record matches the OID associated with the changed object; and
setting the URI field value of the record to the URI associated with the changed object.

8. The method of claim 1, wherein the OID associated with the deleted object is globally unique.

9. The method of claim 1, wherein each record of the object reference table further comprises an external identifier field.

10. A computer system for updating an object reference table comprising a plurality of records, wherein each record represents an object and comprises an object identifier (OID) field and a uniform resource identifier (URI) field, and wherein an object is electronic data that encodes configuration information for a processor-based system, the computer system comprising a processor configured to perform a method, the method comprising:
determining that an object has been deleted, wherein the object is associated with an OID and a URI; and
responsive to determining that the object has been deleted:
determining a record in the object reference table that corresponds to the deleted object, wherein a reference identifier associated with the record matches a reference identifier associated with the deleted object; and
deleting the OID field value of the record or setting the OID field value of the record to null.

11. A non-transitory computer-readable storage medium containing a computer program product for updating an object reference table comprising a plurality of records, wherein each record represents an object and comprises an object identifier (OID) field and a uniform resource identifier (URI) field, and wherein an object is electronic data that encodes configuration information for a processor-based system, the computer program product comprising computer program code for:
determining that an object has been deleted, wherein the object is associated with an OID and a URI; and
responsive to determining that the object has been deleted:
determining a record in the object reference table that corresponds to the deleted object, wherein a reference identifier associated with the record matches a reference identifier associated with the deleted object; and
deleting the OID field value of the record or setting the OID field value of the record to null.

12. A method for updating an object reference table comprising a plurality of records, wherein each record represents an object and comprises an object identifier (OID) field and a uniform resource identifier (URI) field, and wherein an object is electronic data that encodes configuration information for a processor-based system, the method comprising:
using a processor to determine that an object's URI has changed, wherein the object is associated with an OID and a URI;
responsive to determining that the object's URI has changed:
determining a record in the object reference table that corresponds to the changed object, wherein the OID associated with the record matches the OID associated with the changed object; and
setting the URI field value of the record to the URI associated with the changed object;
determining that an object has been created, wherein the object is associated with an OID and a URI; and
responsive to determining that the object has been created:
determining a record in the object reference table that corresponds to the created object, wherein the URI associated with the record matches the URI associated with the created object; and
setting the OID field value of the record to the OID associated with the created object.

13. The method of claim 12, further comprising,
determining that an object has been deleted, wherein the object is associated with an OID and a URI; and
responsive to determining that the object has been deleted:
determining a record in the object reference table that corresponds to the deleted object, wherein a reference identifier associated with the record matches a reference identifier associated with the deleted object; and
deleting the OID field value of the record or setting the OID field value of the record to null.

14. The method of claim 13, wherein the reference identifier associated with the deleted object is globally unique.

15. The method of claim 13, wherein the reference identifier associated with the deleted object is used by another object to refer to the object with which the reference identifier is associated.

16. The method of claim 12, wherein the object that has been created is an imported object.

17. The method of claim 12, wherein the object that has been created is a re-activated object.

18. The method of claim 12, wherein the OID associated with the changed object is globally unique.

19. The method of claim 12, wherein each record of the object reference table further comprises an external identifier field.

20. A computer system for updating an object reference table comprising a plurality of records, wherein each record represents an object and comprises an object identifier (OID) field and a uniform resource identifier (URI) field, and wherein an object is electronic data that encodes configuration information for a processor-based system, the computer system comprising a processor configured to perform a method, the method comprising:
determining that an object's URI has changed, wherein the object is associated with an OID and a URI;
responsive to determining that the object's URI has changed:
determining a record in the object reference table that corresponds to the changed object, wherein the OID associated with the record matches the OID associated with the changed object; and
setting the URI field value of the record to the URI associated with the changed object;
determining that an object has been created, wherein the object is associated with an OID and a URI; and
responsive to determining that the object has been created:
determining a record in the object reference table that corresponds to the created object, wherein the URI associated with the record matches the URI associated with the created object; and setting the OID field value of the record to the OID associated with the created object.

21. A non-transitory computer-readable storage medium containing a computer program product for updating an object reference table comprising a plurality of records, wherein each record represents an object and comprises an object identifier (OID) field and a uniform resource identifier (URI) field, and wherein an object is electronic data that encodes configuration information for a processor-based system, the computer program product comprising computer program code for:

determining that an object's URI has changed, wherein the object is associated with an OID and a URI;

responsive to determining that the object's URI has changed:

determining a record in the object reference table that corresponds to the changed object, wherein the OID associated with the record matches the OID associated with the changed object; and setting the URI field value of the record to the URI associated with the changed object;

determining that an object has been deleted, wherein the object is associated with an OID and a URI; and responsive to determining that the object has been deleted:

determining a record in the object reference table that corresponds to the deleted object, wherein a reference identifier associated with the record matches a reference identifier associated with the deleted object; and deleting the OID field value of the record or setting the OID field value of the record to null.

\* \* \* \* \*

UNITED STATES PATENT AND TRADEMARK OFFICE
CERTIFICATE OF CORRECTION

PATENT NO. : 8,065,732 B1  
APPLICATION NO. : 12/630573  
DATED : November 22, 2011  
INVENTOR(S) : Chad Ward et al.

Page 1 of 1

It is certified that error appears in the above-identified patent and that said Letters Patent is hereby corrected as shown below:

In column 9, line 8, in Claim 6, delete "are-activated" and insert -- a re-activated --, therefor.

In column 10, line 18, in Claim 13, delete "comprising," and insert -- comprising: --, therefor.

Signed and Sealed this
Twenty-fifth Day of December, 2012

David J. Kappos
*Director of the United States Patent and Trademark Office*